Figure 1:
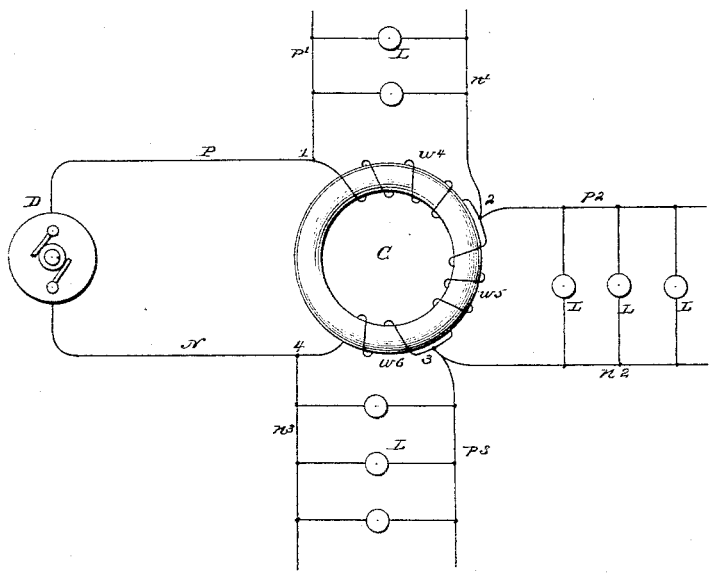

(No Model.) 2 Sheets—Sheet 1.

W. STANLEY, Jr.
APPARATUS FOR ELECTRICAL CONVERSION AND DISTRIBUTION.

No. 387,117. Patented July 31, 1888.

Witnesses,
W. S. Bohrer.
Chas. D. Fowler.

Inventor,
William Stanley Jr.
Pope, Edgcomb & Terry.
Attorneys.

(No Model.) 2 Sheets—Sheet 2.

W. STANLEY, Jr.
APPARATUS FOR ELECTRICAL CONVERSION AND DISTRIBUTION.
No. 387,117. Patented July 31, 1888.

Witnesses
Geo. W. Breck.
Eugene J. Reilly.

Inventor.
Wm. Stanley Jr.
By his Attorneys
Pope Edgcomb & Terry.

United States Patent Office.

WILLIAM STANLEY, JR., OF GREAT BARRINGTON, MASSACHUSETTS, ASSIGNOR TO THE WESTINGHOUSE ELECTRIC COMPANY, OF PITTSBURG, PENNSYLVANIA.

APPARATUS FOR ELECTRICAL CONVERSION AND DISTRIBUTION.

SPECIFICATION forming part of Letters Patent No. 387,117, dated July 31, 1888.

Application filed February 28, 1887. Serial No. 229,117. (No model.) Patented in England July 12, 1887, No. 9,745; in France July 12, 1887, No. 184,786; in Belgium July 12, 1887, No. 78,166; in Italy July 12, 1887, XLIII, 359, and in Canada November 10, 1887, No. 27,981.

*To all whom it may concern:*

Be it known that I, WILLIAM STANLEY, Jr., a citizen of the United States, residing in Great Barrington, in the county of Berkshire and State of Massachusetts, have invented certain new and useful Improvements in Apparatus for Electrical Conversion and Distribution, (which has been patented in the following countries: Great Britain, No. 9,745, July 12, 1887; France, No. 184,786, July 12, 1887; Belgium, No. 78,166, July 12, 1887; Italy, No. 359, XLIII, July 12, 1887, and Canada, No. 27,981, November 10, 1887,) of which the following is a specification.

The invention relates to systems of electrical distribution wherein alternating, undulatory, intermittent, or pulsatory electric currents of any required potential and derived from any convenient source are transformed or converted to a greater or less extent into counter electro-motive force or induced currents.

The invention comprises an improved method of operation, whereby the translating devices may be supplied with currents of the proper or required potential with greater economy and convenience than by the methods heretofore practiced.

The general plan of the invention consists in performing the following steps: first, the transmitting of alternating, undulatory, intermittent, or pulsatory currents of any required potential to an inductorium consisting of a mass of iron situated in inductive relation to a continuous conductor; second, establishing thereby a constant counter electro-motive force which is equally distributed throughout the conductor in such inductive relation; third, utilizing the whole or any desired portion of such counter electro-motive force in the production of a composite current, which is formed in part by the impressed electro-motive force and in part by the counter electro-motive force, and, fourth, operating by such composite current translating devices placed in two or more work-circuits, the excess of energy in one work-circuit being transferred to another by means of the magnetic field. The composite current results from the superposition of more or less of this counter electro-motive force upon the impressed electro-motive force. The translating devices placed in the work-circuit, therefore, are operated neither by the impressed nor by the counter electro-motive force solely, but by the resultant composite current. When it is desired to vary the potential or to operate the translating devices under a difference of potential other than that of the impressed electro-motive force, it may be effected by changing the value of the counter electro-motive force utilized, and thus the potential of the composite current.

The invention will be best understood by reference to the accompanying drawings, in which—

Figure 2:
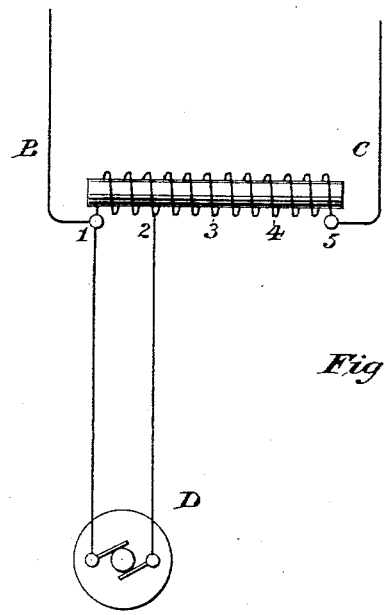
Figure 3:
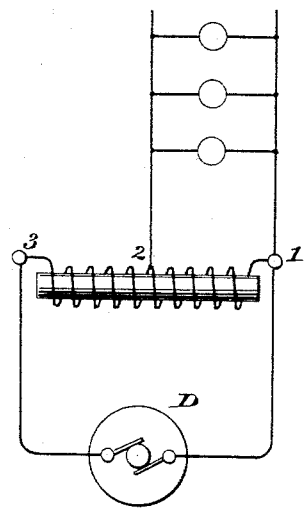

Figure 1 is a theoretical diagram illustrating an organization of circuits and apparatus embodying the invention. Figs. 2 and 3 are theoretical diagrams serving to aid in an explanation of the purpose of the invention.

Referring to Fig. 1, let D represent a suitable dynamo-electric generator or other suitable apparatus for producing undulatory, intermittent, alternating, or pulsatory currents. Such currents are transmitted in the present instance through the mains P N, leading to the respective terminals of a conductor, 1 2 3 4, which acts inductively upon a core of soft iron or equivalent magnetizable material, $c$, which is preferably made in the form of an endless ring, so as to form a closed magnetic circuit, and they may be so situated with reference to each other that every portion of the conductor 1 2 3 4 shall be in mutual inductive relation to every other portion through the medium of the soft iron. The conductor 1 2 3 4 may with advantage be wound helically upon the ring $c$ in the manner shown; but the particular disposition of such conductor with reference to the mass of iron is not material so far as this invention is concerned, and it may be varied as circumstances dictate. The conductor and the mass of magnetizable material together constitute what is herein termed the "autoconverter."

The conductor 1 4, although continuous, may be regarded as consisting of any required number of sections from the dividing-points, between which branches or conductors are led off, as shown in the figures. For example, the conductor 1 4 is shown in Fig. 1 as divided into three sections, $w^4\ w^5\ w^6$. At the points 1 2 3 4 branches or conductors $p'\ n'\ p^2\ n^2\ p^3\ n^3$ are led off, and between these branches are placed electric lamps or other equivalent translating devices, L L, so arranged that they may form closed work-circuits. The action of the auto-converter will best be understood by first demonstrating two laws which would maintain in a converter having no loss by reason of heat, resistance, imperfect magnetization, &c., or, in other words, an electrically-perfect converter. Referring for this purpose to the diagram Fig. 2, let B represent the coil surrounding the core, the two together composing an electrically-perfect converter. It is here shown as divided into four equal sections represented by the numerals 1 2, 2 3, 3 4, 4 5. If, now, the generator is supplying a difference of potential of, say, fifty volts, and this difference of potential be applied between points 1 and 2, then a certain necessary distribution of potential will occur along the coil B. This is such that between each of the equal sections 1 2, 2 3, 3 4, 4 5 a difference of potential is manifested exactly equal to that applied between 1 and 2. If this same difference of potential were applied to the section 2 3, exactly the same result would follow, and so in any case in which the same length of conductor is included between points of contact the distribution of potential along the coil will be exactly the same. Consequently it is possible to derive from the coil B any desired difference of potential by making contact at two points which are separated from each other by a distance bearing the same relation to the unit-distance 1 2 as the required difference of potential bears to the applied potential. If, now, instead of connecting at the points 1 and 2, the connection is made at the points 1 and 3, then the applied difference of potential of fifty volts would be distributed over twice as great a portion of the coil B as before, and consequently the difference of potential per unit length would be less than in the first case—that is to say, one-half as great; and in order to determine what difference of potential is taken off by any circuit connected between the points 1 and 5 it is necessary only to change the proportion so that the distance included is related to the section 1 3 in the same ratio as the desired difference of potential bears to the applied difference of potential, or, in other words, by exactly the same method as employed in the former instance. These theoretical results may in practice be modified to a greater or less extent by resistance, heat, imperfect magnetization, &c., of the converter; but it may be stated that this distribution of potential forms a fundamental feature in the performance of an auto-converter such as the one described and claimed, and it would be impossible to operate it in the manner here proposed were this not the case.

Referring now to diagram Fig. 3, it will be demonstrated that the distribution of current in the auto-converter is subject to a law as well defined as that of the distribution of difference of potential, and this law is that the algebraic sum of the currents traversing the different sections of the coil multiplied by the number of turns included in such sections is equal to zero. Considering, again, that the converter is electrically perfect, and that the generator D is supplying a difference of potential of two hundred volts between the terminals of the coil B at points 1 and 3, and that the work-circuit is connected at points 1 and 2, the point 2 being equidistant from the points 1 and 3, then it is known from the previous consideration that the difference of potential between the points 1 and 2 is equal to that between the points 2 and 3, and each is one-half of the total difference of potential of the circuit. In order that the law which has been stated should hold true, it is therefore necessary that the current in the section 3 2 should traverse its coil in an opposite direction to that in the section 1 2, and that these currents should be equal in amount, and therefore neutralize each other. The current traversing the portion 2 3 is supplied by the generator. That in the section 1 2 is induced by the current in the section 2 3. These currents combine in parallel in the work-circuit and form a composite current equal to their sum. The production of this composite current is essential to the operation of the auto-converter, for the reason that it constitutes the current which effects the equalization of potential on the circuits supplied therefrom. The self-induction opposed to the flow of currents in the section of the coil is reduced to zero so far as their reactions on each other are concerned, and a product of each current by the number of turns in its coil is equal to the same product in the other coil; but since they are in opposite directions their sum is zero.

Considering that the point 2 is twice as far from the point 1 as it is from the point 3, then the difference of potential included between the terminals 1 and 2 would be twice as great as that between the points 2 and 3, and the current in the portion 1 2 of the coil would be one-half as great as that in the portion 2 3. Then there would be in the section 1 2 a length of 2 and a current of 1, and in the section 2 3 there would be a length of 1 and a current of 2. These two being opposed to each other, their sum would be zero, as before.

The operation of the organization shown in Fig. 1 will now be readily understood. In this example, for sake of illustration, the conductor is shown as divided into three sections, the section $w^4$ having four convolutions, $w^5$ three convolutions, and $w^6$ two convolutions. Branches are led off from the junction of the conductors P and N with the coil. In this case, if we assume the difference of potential at the terminals 1 and 4 to be, say, nine hundred volts, then the difference of potential of the composite current delivered to the branches $p'$ and $n'$ would be four hundred volts, between $p^2$ and $n^2$ three hundred, and between $p^3$ and $n^3$ two hundred, the potential in all cases being uniformly distributed between the points 1 and 4.

It will of course be understood that by dividing the conductor 1 4 into equal instead of unequal parts any required number of work-circuits may be attached having equal potential, and consequently there will be an equal current in each, providing other conditions are the same. The number of conductors in inductive relation to the core—that is to say, in the magnetic field—may therefore be regarded as being divided into any number of equal or unequal parts, forming, as it does, a conductor the whole or a greater or less portion of which is common to a number of different closed circuits, in any one of which a source of electricity may be included, while the translating devices may be included in one or all of the remaining closed circuits.

I claim as my invention—

The hereinbefore-described method of equalizing the distribution of potential upon two or more work-circuits, which consists, first, in creating a magnetic field common to all the work-circuits by establishing in the supply-circuit an electro-motive force; second, in inducing a counter electro-motive force in the supply-circuit, and, third, in supplying two or more work-circuits with composite currents formed by the impressed and counter electro-motive force, whereby the excess of energy in one work-circuit is transferred to another by means of the magnetic field, substantially as described.

In testimony whereof I have hereunto subscribed my name this 25th day of February, A. D. 1887.

WILLIAM STANLEY, Jr.

Witnesses:
CLARKSON A. COLLINS,
A. CHALKLEY COLLINS.